United States Patent [19]

Ishikawa

[11] Patent Number: 4,902,146
[45] Date of Patent: Feb. 20, 1990

[54] ELECTRONIC APPARATUS WITH MEMORY CARD

[75] Inventor: Takao Ishikawa, Ohme, Japan

[73] Assignee: Kabushiki Kaisha Toshiba, Kanagawa, Japan

[21] Appl. No.: 223,509

[22] Filed: Jul. 25, 1988

[30] Foreign Application Priority Data

Jul. 31, 1987 [JP] Japan .................. 62-191654

[51] Int. Cl.⁴ ............................ B41J 29/02; B41J 5/44
[52] U.S. Cl. ........................................ 400/61; 400/121; 400/692
[58] Field of Search .............. 400/50, 61, 70, 121, 400/692

[56] References Cited

U.S. PATENT DOCUMENTS

| | | | |
|---|---|---|---|
| 4,660,999 | 4/1987 | Tsuneki | 400/61 |
| 4,710,886 | 12/1987 | Heath | 400/70 X |
| 4,730,947 | 3/1988 | Ikeda | 400/61 |
| 4,763,281 | 8/1988 | Arakawa | 400/61 X |

FOREIGN PATENT DOCUMENTS

| | | | |
|---|---|---|---|
| 232974 | 11/1985 | Japan | 400/121 |
| 63461 | 4/1986 | Japan | 400/50 |
| 154973 | 7/1986 | Japan | 400/70 |
| 222763 | 10/1986 | Japan | 400/692 |

OTHER PUBLICATIONS

IBM TDB, vol. 27, No. 12, May 1985, pp. 6887-6890, "Extension Device for a Personal Computer".

Primary Examiner—Paul T. Sewell
Attorney, Agent, or Firm—Finnegan, Henderson, Farabow, Garrett and Dunner

[57] ABSTRACT

An electronic apparatus of the present invention provides a plurality of equipping portions to be equipped with a memory card for storing a plurality of information, detect means for detecting the equipping portion equipped with the memory card from among the plurality of equipping portions, memory means for previously storing corresponding relationships between the equipping portion to be equipped with the memory card and one of information of the plurality of information stored in the memory card and select means for reading out the corresponding relationship from the memory means in response to the detection of the detect means and for selecting the corresponding one of information in the memory means in response to the corresponding relationship, which the apparatus allows it possible to easily select the information from among the plurality of information stored in the memory card with a simplified structure.

6 Claims, 5 Drawing Sheets

ELECTRONIC APPARATUS WITH MEMORY CARD

The present application claims priority of Japanese Patent Application No. 62-191654 filed on July 31, 1987.

FIELD OF THE INVENTION AND RELATED ART STATEMENT

The present invention relates to an electronic apparatus, and more particularly to an electronic apparatus capable of performing a control operation of, for instance, an emulation by accessing to a memory card.

In conventional electronic apparatus such as a printing apparatus in which an instruction system for controlling itself is not standardized or unified, each apparatus is controlled in accordance with commands that are different for each different apparatus. As a result, if a computer having an instruction system for a printing apparatus A is connected with a printing apparatus B having an instruction system different from that of the printing apparatus A, the printing apparatus B cannot be controlled by the computer. In order to solve this problem, two methods have been used. One method has involved employing a computer having instruction systems for both of the printing apparatus A and the printing apparatus B. The second method has involved controlling the operation of the printing apparatus B by interpreting the instruction system of the printing apparatus A so as to control the printing apparatus B even in accordance with the instruction system of the printing apparatus A. The latter method is generally called "emulation". For realizing the latter method, for instance, the memory card which stores a program (hereinafter called "emulation program") for controlling the operation of the printing apparatus B by interpreting the instruction system of the printing apparatus A is provided in the printing apparatus B, thereby making it possible to perform the emulation.

Each of the above-described memory card for the emulation generally stores its own kind of program.

Advancement of the semiconductor technologies has increased the memory capacity so that the memory card storing programs for a plurality of emulations has been realized.

In performing the emulation using the memory card which stores programs for a plurality of emulations, a number of problems and answers remain, such as which program should be selected and how to select?

In a general method proposed, an exchange switch is equipped on the memory card and a program is selected by exchanging the operation of the exchange switch. This method, however, causes a disadvantage of the increase in cost and is not practical in use.

OBJECT AND SUMMARY OF THE INVENTION

An object of the present invention is to make it easier to select the information to be used without using an exchange switch when plural kinds of emulation programs are stored in one memory card.

The present invention includes a plurality of equipping portions equipped with a memory card which stores a plurality of information, a detect means for detecting the equipping portion equipped with the memory card from among the plural equipping portions, a memory means for storing the corresponding relationships between the equipping portion to be equipped with the memory card and one of information of the plurality of information stored in the memory card, a select means for reading out the corresponding relationship from the memory means on the basis of the detected information in response to the result of the equipping portion equipped with the memory card by the detect means and for selecting the corresponding one of information in the memory card based upon the corresponding relationship.

According to the electronic apparatus of the present invention, corresponding relationships between the equipping portion to be equipped with the memory card and one of information from among the plurality of information stored in the memory card are previously stored, the equipping portion equipped with the memory card is detected from the plural equipping portions, the corresponding relationship is read out from the memory means on the basis of the detected information, and the corresponding one of information in the memory card is selected in accordance with the corresponding relationship, thereby making it possible to select one of information of the plurality of information stored in the memory card with a simplified structure, and the exchange switch becomes needless.

DETAILED DESCRIPTION OF PREFERRED EMBODIMENT

Now, the preferred embodiment of the present invention will be described below with reference to the drawings.

Figure 1:
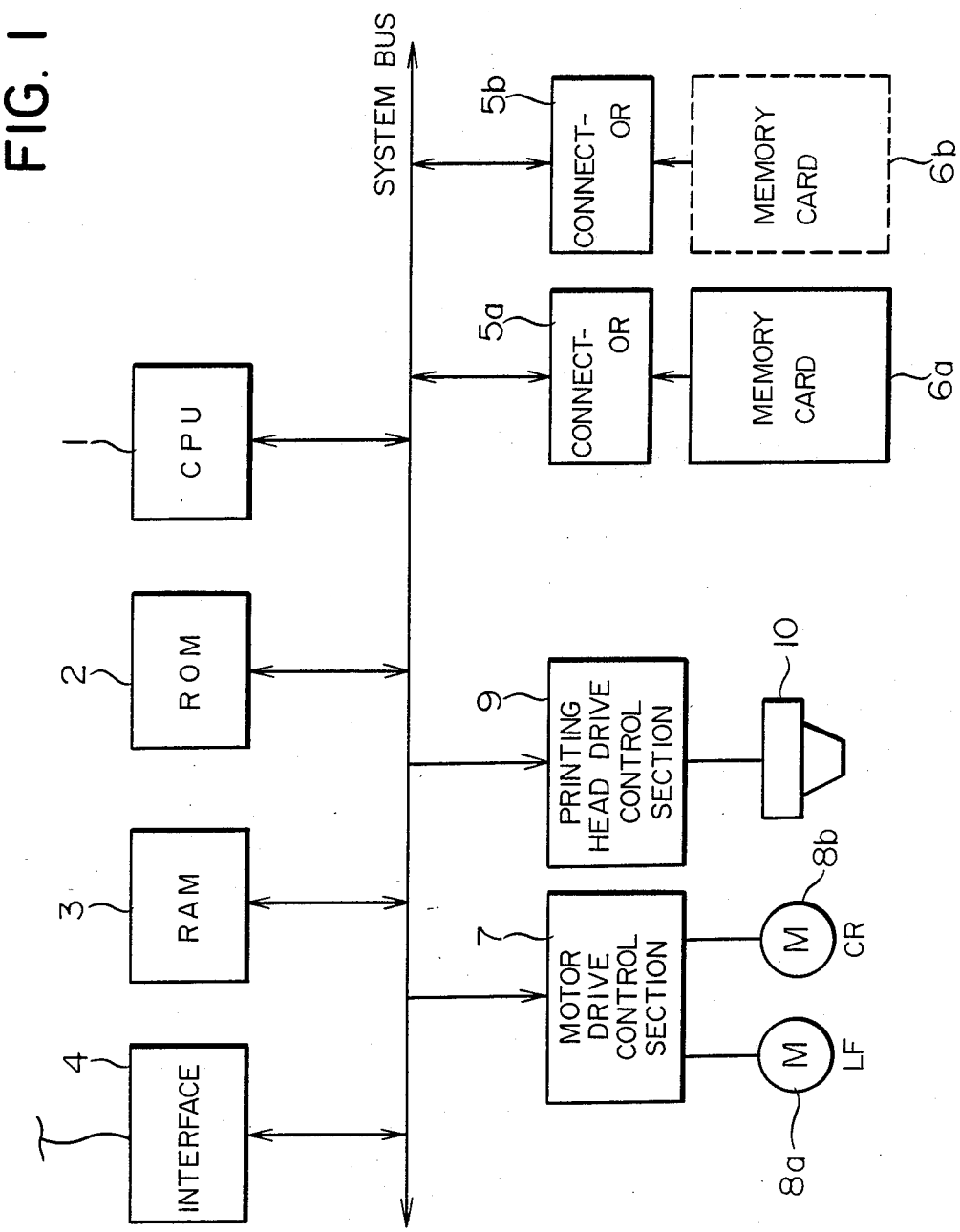
FIG. 1 is a block diagram of a printing apparatus of the electronic apparatus according to one embodiment of the present invention.

FIG. 1 is a block diagram representing the structure of the printing apparatus of the electronic apparatus according to one embodiment of the present invention.

CPU 1 controls the whole apparatus, detects one connector equipped with a memory card 6a (6b) from two connectors 5a and 5b, selects a region A (B) of the memory card 6a (6b) corresponding to the connector 5a (5b) equipped with the memory card 6a (6b) and reads out the information in the region A (B).

A ROM 2 stores a control program to be used for controlling the whole apparatus, dot pattern data (font data) of the letters to be printed, various kinds of control data and one kind of emulation program (resident emulation program), and also previously stores a table of the corresponding relationship between the connectors 5a, 5b and the memory card 6a, 6b. The corresponding relationship between connectors 5a, 5b and the memory cards 6a, 6b indicates that the region A is selected when the memory card 6a is equipped in the connectors 5a, and the region B is selected when the memory card 6b is equipped in the connectors 5b.

A RAM 3 temporarily stores the printing data and various kinds of control information. An interface section 4 controls an input/output of the data for the external apparatus (not shown) such as a personal computer.

The equipping portion, i.e., the connectors 5a, 5b are equipped with the memory cards 6a, 6b and connect the memory elements of the memory cards 6a, 6b with the system bus. The same memory card is used as the memory cards 6a, 6b and numerals 6a and 6b are respectively attached when it is equipped in the connectors 5a and 5b. The memory elements are equipped in the memory cards 6a, 6b.

A motor drive control section 7 controls the respective drive motors 8a, 8b in a paper feeding mechanism (not shown) and a carriage mechanism (not shown). A printing head drive control section 9 controls the drive of a printing head 10. The respective sections are connected through the system bus.

Figure 2:
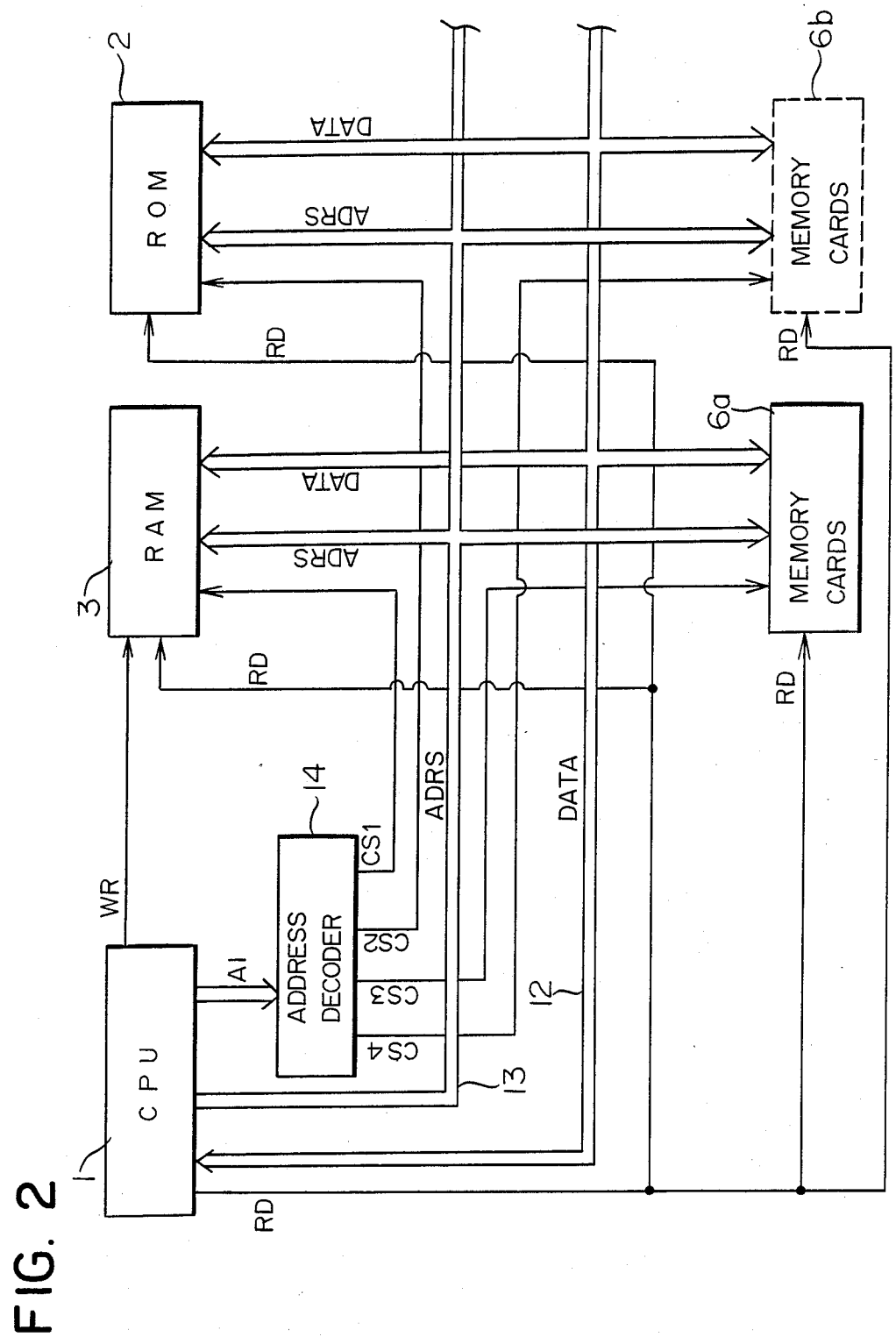
FIG. 2 is a block diagram showing a structure of the main portion the printing apparatus.

FIG. 2 is a block diagram representing the structure of the main portion of the printing apparatus.

The CPU 1 supplies a read signal RD to the memory card 6a equipped in the connector 5a, the memory card 6b equipped in the connector 5b and the ROM 2 and RAM 3, and a write signal WR to the RAM 3.

Under the condition where the memory card 6a (or 6b) is equipped in the connector 5a (or 5b), the CPU 1, the ROM 2, and RAM 3 and the memory card 6a (memory card 6b) are connected through a data bus 12 and an address bus 13.

An address decoder 14 produces chip select signals CS1, CS2, CS3, and CS4 on the basis of an address signal A1 from the CPU 1, and supplies the chip select signal CS1 to the RAM 3, the chip select signal CS2 to the ROM 2, the chip select signal CS3 to the memory card 6a and the chip select signal CS4 to the memory card 6b.

If the chip select signals CS1, CS2, CS3, and CS4 are in the "ON" state, the RAM 3 et al, supplied with the signal becomes accessible.

Figure 3:
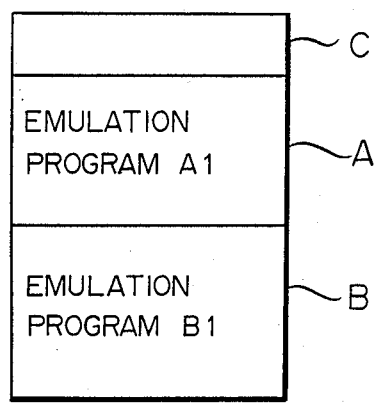
FIG. 3 is showing a memory map of the information stored in a memory card.

FIG. 3 is representing a memory map of the information stored in the memory card. There are three kinds of cards, within the memory card, i.e., an emulation card which stores the emulation program, a font card which stores the latter font data with the dot pattern, and a RAM card used as the buffer.

FIG. 3 represents the memory map of the information stored in the emulation card. In the memory element of this emulation card, a plurality (there are "two" in this embodiment) of emulation programs A1 and B1 are respectively stored in the prdetermined regions A and B. Similarly, the fonts A2 and B2 are respectively stored in the regions of the font card and the predetermined regions A and B respectively correspond to buffer memories A3 and B3 in the RAM card.

Into the head address of the memory element, an ID code C for indicating what kind of information is stored in the memory element, is registered. This ID code C is used to detect whether the memory card 6a is emulation card, the font card or the RAM card.

Figure 4:
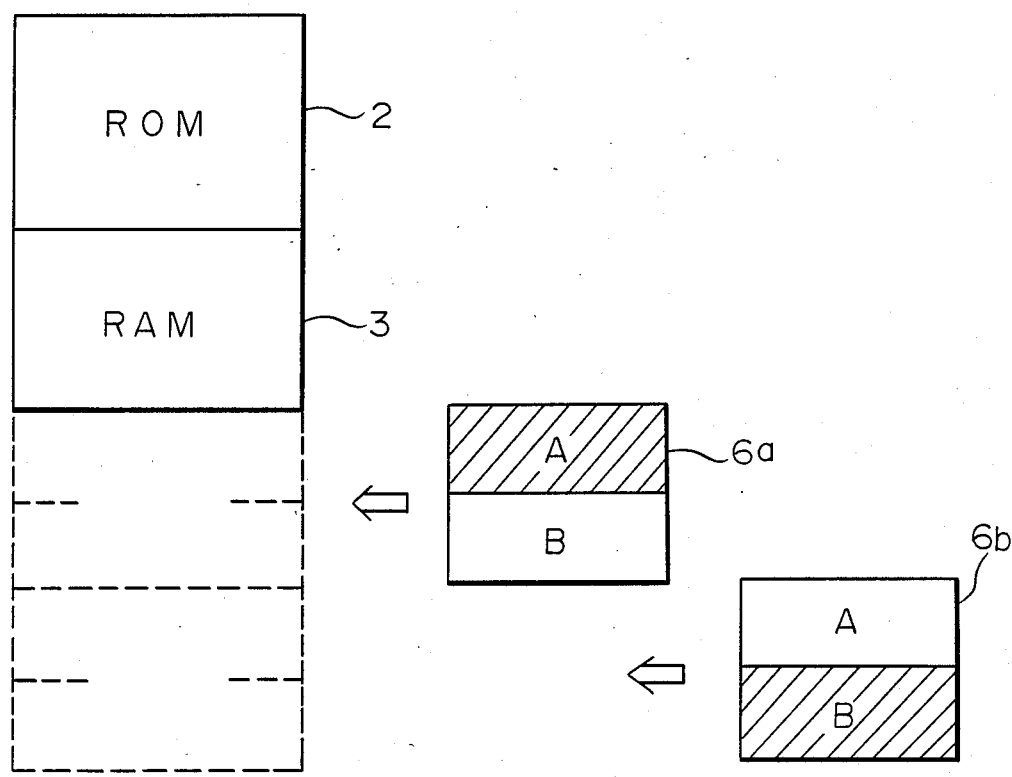
FIG. 4 is showing a memory region of the whole printing apparatus.

FIG. 4 shows a memory region to which the CPU 1 may directly access in the printing apparatus. The region A becomes a part of memory when the memory card 6a is inserted into the connector 5a and the region B becomes a part of memory when the memory card 6b is inserted into the connector 5b.

Figure 5A:
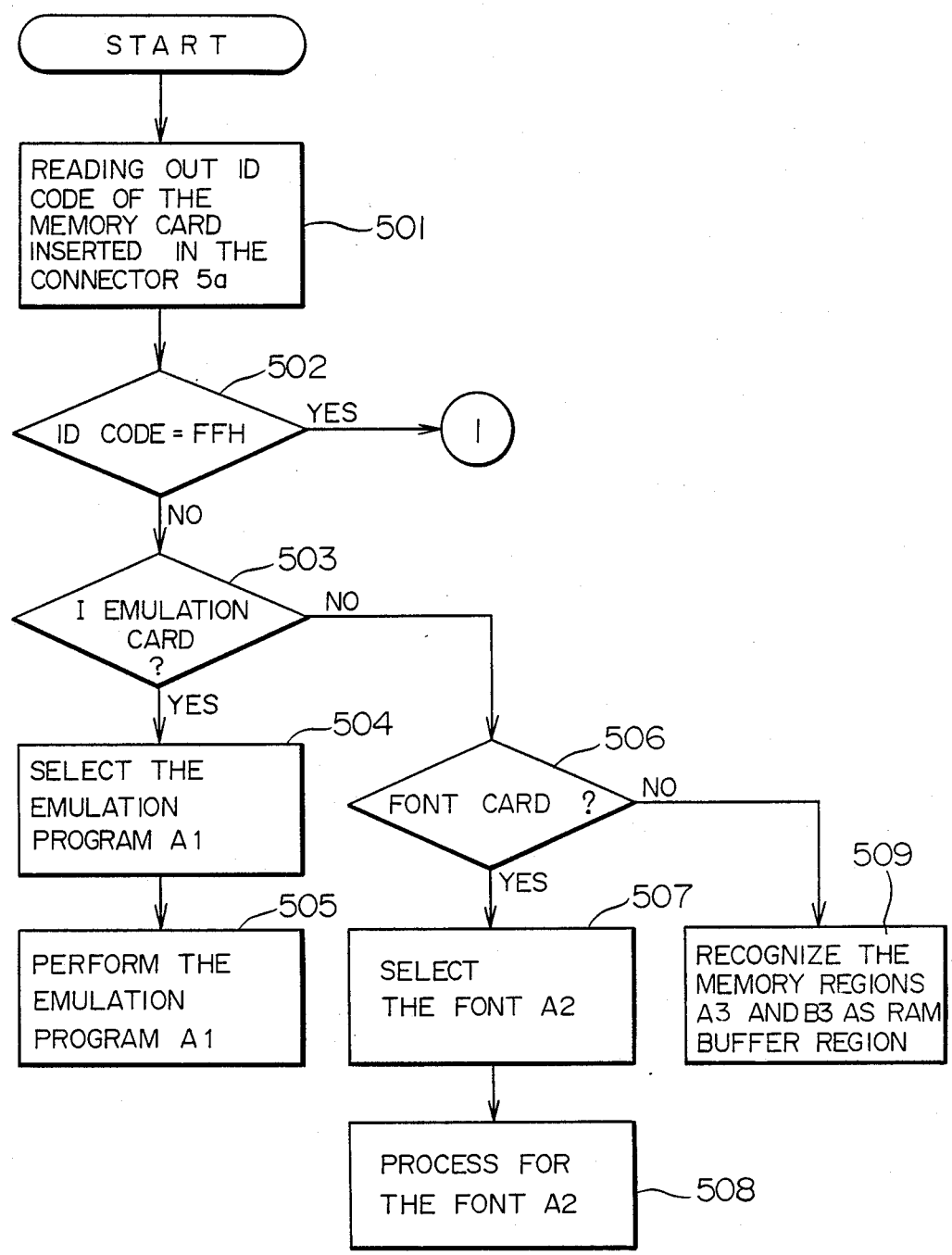
FIGS. 5(a) and 5(b) together constitute a flow chart explaining the operation of the printing apparatus.
Figure 5:
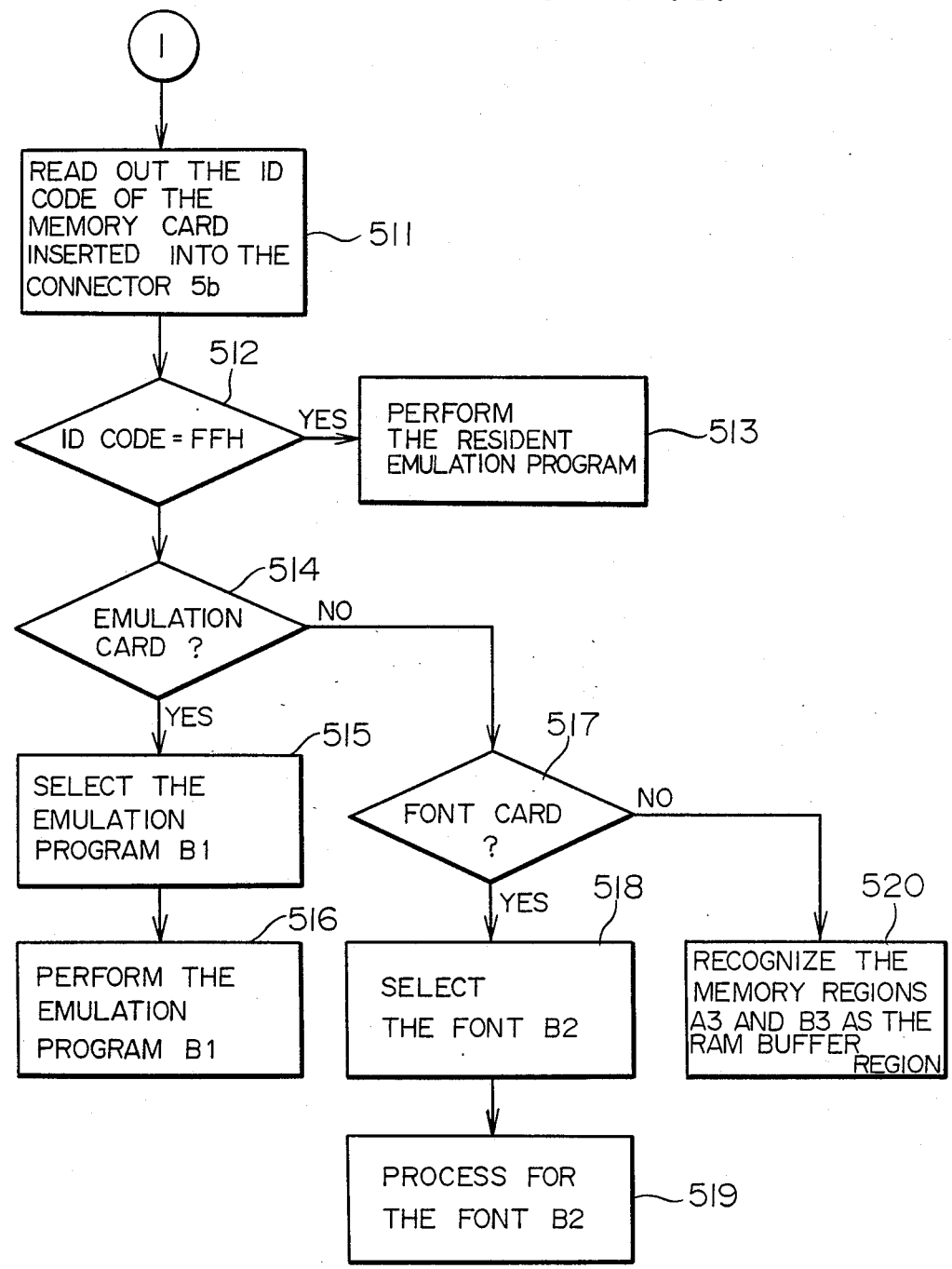

Next, the operation of the present embodiment will be described with reference to a flow chart shown in FIG. 5.

Generally, the printing apparatus requires the detection of the kind of the memory card inserted in the connector at the time of power "ON". The detection is carried out as follows:

The CPU 1 sends an address signal ADRS to the address bus 13 after making the chip select signal CS3 "ON" through an address decoder 14, reads out the ID code C of the memory card 6a inserted into the connector 5a (step 501), and recognizes the selection of the region A in the memory card 6a from the table of the ROM 2 if the ID code C is not [FFH](step 502). In general, by applying the voltage +Vcc to the data bus 12 through the pull-up resistance in the case where the memory card is not connected with the connector, when the ID code C is read out the values of all signal lines of the data bus 12 become logical value "1" so that the value of the ID code C is read out as [FFH](the value "FF" in the hexadecimal number system), making it possible to detect whether the memory card is connected with the connector. ID code C detects whether this memory card 6a is the emulation card or not (step 503). If it is the emulation card, it is recognized that the memory card 6a is inserted into the connector 5a. As a result, CPU 1 selects the emulation program stored in the memory region A of the memory card 6a (step 504) and carries out the emulation program A1 (step 505).

For performing the emulation, the control command inputted through the interface section 4 is interpreted by the emulation program and the control operation is carried out in accordance with the control program of ROM 2.

In the step 503, when it is detected that the card is not the emulation card based upon the read-out ID code C, it is detected whether this memory card 6a is the font card or not based upon the ID code C (step 506).

When it is the font-card, the table of ROM 2 is referred in accordance with the recognition of the step 502 that the memory card 6a is inserted into the connector 5a. As a result, CPU 1 selects the font A2 stored in the memory region A of the memory card 6a (step 507) and carries out the operation by using the selected font A2 (step 508).

In the detection step 506, when it is detected to be not the font card, this memory card 6a is detected to be the RAM card, thereafter, the memory regions A3 and B3 in the memory card 6 are unified and used as one RAM buffer (step 509).

In the detection step 502, when the ID code C is [FFH], the CPU 1 detects that the memory card 6a is not inserted into the connector 5a, sends the address signal ADRS to the address 13 after making the chip select signal CS4 "O" through the address decoder 14, and reads out the ID code C of the memory card 6b inserted into the connector 5b (step 511). When the read-out ID code C is [FFH] (step 512), it is detected that the memory card 6a (6b) is not inserted into the connectors 5a and 5b, and the resident emulation program stored in the ROM 2 is performed (step 513).

When the ID code C is not [FFH] (step 512), the CPU 1 detects the memory card 6b is inserted into the connector 5b, and detects whether the memory card 6b is the emulation card or not on the basis of the ID code C (step 514). When it is the emulation card, the table of ROM 2 is referred in accordance with the recognition of the step 512 that the memory card 6b is inserted into the connector 5b. As a result, CPU 1 selects the emulation program B1 stored in the memory region B of the memory card 6b (step 515) and carries out the selected emulation program B1 (step 516).

In the detection step 514, when this memory card 6b is not the emulation card, the CPU 1 detects whether it is the font card or not by using the ID code C (step 517).

When it is the font card, the table of ROM 2 is referred in accordance with the recognition of step 512 that the memory card 6b is inserted into the connector 5b. As a result, CPU 1 selects the font B2 stored in the memory region B (step 518) and carries out the operation by using the selected font B2 (step 519).

In the step 517, when it is not the font card, the CPU 1 detects that the memory card 6b inserted into the connector 5b is the RAM card, thereafter the memory regions A3 and B3 in the memory card 6 are unified and used as one RAM buffer (step 520).

Thus, according to the present embodiment the region A and B in the memory card may be easily selected by inserting the memory card 6a (6b) into either of the connectors 5a and 5b.

It is to be noted that in this embodiment the connectors 5a and 5b are not newly provided for the printing apparatus. Two connectors which have been provided in the conventional apparatus for the RAM card or the font card and the like are used as the connectors 5a and 5b. As a result, there causes no increase in cost by the printing apparatus of the present invention.

Additionally, the present invention is not limited by the above-described embodiment.

For instance, although the foregoing embodiment describes the electronic apparatus capable of using three kinds of memory cards as the memory card, the present invention is, of course, applicable to the electronic apparatus with only one kind of memory card (emulation card).

Furthermore, the present embodiment describes the printing apparatus, however, the present invention is not limited by this embodiment.

What is claimed is:

1. An electronic apparatus, comprising:
a memory card for storing a plurality of information portions;
a plurality of identifiers coupled to said memory card;
detect means for detecting the identifiers;
memory means for storing relationships between each of the identifiers and a corresponding one of the plurality of information portions stored in said memory card; and
select means for reading out said corresponding relationship from said memory means in response to the detection of said detect means and for selecting the corresponding one of information portions in said memory means in response to said corresponding relationship.

2. The electric apparatus as claimed in claim 1 further comprising reading means for reading out the corresponding one of information selected by the select means.

3. The electronic apparatus of claim 1 or 2 wherein said memory card is an emulation card having a plurality of emulation programs.

4. The electronic apparatus of claim 1 or 2 wherein said memory card is a font card having a plurality of font data.

5. The electronic apparatus of claim 1 or 2 wherein said electronic apparatus is a printing apparatus.

6. The electronic apparatus of claim 1 wherein said identifiers are connectors.

* * * * *